United States Patent
Roos et al.

[11] Patent Number: 6,031,891
[45] Date of Patent: Feb. 29, 2000

[54] DUAL REFERENCE BLACKLEVEL CLAMPING DEVICE AND METHOD FOR VIDEO LINE NOISE REMOVAL

[75] Inventors: Pieter Gerhard Roos, Bainbridge; Andrew J. Ivan, Aurora, both of Ohio

[73] Assignee: Picker International, Inc., Highland Heights, Ohio

[21] Appl. No.: 09/070,401

[22] Filed: Apr. 30, 1998

[51] Int. Cl.[7] .................................................. H05G 1/64
[52] U.S. Cl. ............................................. 378/98.2; 378/4
[58] Field of Search .............................. 378/98.2, 4, 98.8

[56] References Cited

U.S. PATENT DOCUMENTS 5,528,043  6/1996  Spivey et al. ....................... 250/370.09

*Primary Examiner*—David P. Porta
*Assistant Examiner*—Michael J. Schwartz

*Attorney, Agent, or Firm*—Fay, Sharpe, Fagan, Minnich & McKee, LLP

[57] ABSTRACT

A medical diagnostic imaging device (A) compensates for non-uniform line correlated noise generated in an image receptor (26). The image receptor receives x-rays transmitted from an x-ray source (12) and generates a raster line of image data. The image receptor includes an active area (30), a first reference zone (32) bounded on a first side of the active area, and a second reference zone (34) bounded on a second side of the active area opposite to the first side. The reference zones prevent image information from being received by corresponding pixels of the raster line. The outputs of a first plurality of raster line pixels corresponding to the first reference zone (32) are averaged, and the outputs of a second plurality of raster line pixels corresponding to the second reference zone (34) are averaged. An interpolated offset value for each raster line pixel is determined based on i) the average output values of the first plurality and second plurality of raster line pixels, and ii) the location of the pixel within the raster line. The output value of the raster line pixel is modified based on the interpolated offset value calculated.

18 Claims, 2 Drawing Sheets

DUAL REFERENCE BLACKLEVEL CLAMPING DEVICE AND METHOD FOR VIDEO LINE NOISE REMOVAL

BACKGROUND OF THE INVENTION

The present invention relates to the medical diagnostic imaging arts. It finds particular application in conjunction with a dual reference blacklevel clamping device and method for reducing video line noise from an image receptor associated with a diagnostic imaging system, and will be described with particular reference thereto. However, it should be appreciated that the present invention may also find application in conjunction with other types of imaging systems and applications where reducing video line noise is desirable.

The sensitivity of all x-ray image detector devices, including flat panel image sensors or receptors, is limited by noise, i.e., random fluctuations in signal that are competing with data or other information that represents or otherwise defines a captured image. One type of noise that is characteristic of some flat panel image receptors, such as amorphous Silicon-based, flat panel, image receptors, is line correlated noise. Line correlated noise can be defined as random fluctuations that affect a whole raster line of a video frame in a manner that causes all the picture elements ("pixels") of a raster line to commonly deviate from their actual captured image values.

The manifestation of line correlated noise in a video image displayed on a video monitor is stripes that fluctuate in intensity across the width of the image. This is an undesirable effect that is highly distracting to medical personnel, such as physicians, using the imaging system to perform critical work, such as live interventional procedures.

There are known image processing techniques, generally referred to as blacklevel clamping or line noise clamping, for reducing the amount of line correlated noise generated in image receptors. These techniques rely on a single, vertically elongated (i.e., perpendicular to the image raster lines), clamp or reference zone along either side edge of an image frame or array that is "blacked out" from receiving or capturing image information. The image information can be visible light in the case of a video camera, or the light output from a scintillator screen, in the case of a fluoroscopy system.

The "blacked-out" reference zone is a predetermined number of pixels wide (typically 1 to 256 pixels in length). The only output signals or "information" received from the pixels within the "blacked-out" reference zone is random noise and line correlated noise—the same line noise that affects the pixels in the exposed or "active" region of the image receptor.

Line noise cancellation involves calculating the average output value of the reference pixels for each raster line of each video frame to average out the random noise fluctuations of each reference pixel, and to yield the error introduced in that particular raster line by line noise alone. The resulting error value is then uniformly subtracted from each of the "active" pixels in the corresponding raster line prior to being displayed on a video monitor.

The known blacklevel clamping or line noise clamping techniques neglect the fact that, for some image receptor implementations, line correlated noise may not be uniform across the entire raster line. That is, the line correlated noise that is summed with the received or sensed image information may have a random slope or random profile across the image width. In these cases the conventional clamping techniques will not yield satisfactory results, as the calculated error due to line noise will only be valid in or near the reference zone. Thus, known blacklevel clamping or line noise clamping techniques yield imperfect line noise cancellation in those image acquisition systems where line correlated noise has a non-uniform profile across an image width.

Accordingly, it has been considered desirable to develop a new and improved dual reference blacklevel clamping device and method for reducing video line noise from an image receptor which meets the above-stated needs and overcomes the foregoing difficulties and others while providing better and more advantageous results.

SUMMARY OF THE INVENTION

In accordance with one aspect of the present invention, a medical diagnostic imaging device is disclosed. The medical diagnostic imaging device includes a source for generating x-rays, an image receptor for receiving the x-rays, and an image processing subsystem for processing a raster line of image data received from the image receptor. The image processing subsystem includes a mechanism for determining an interpolated offset value for each pixel element of the raster line to compensate for non-uniform line correlated noise generated in the image receptor.

In accordance with another aspect of the present invention, a medical diagnostic imaging device is disclosed. The medical diagnostic imaging device includes a source for generating x-rays, an image receptor for receiving the x-rays, and an image processing subsystem for processing a raster line of image data received from the image receptor. The image receptor includes an active area, a first reference zone bounded on a first side of the active area, and a second reference zone bounded on a second side of the active area opposite to the first side. The reference zones prevent image information from being received by corresponding pixel elements of the raster line.

In accordance with yet another aspect of the present invention, a method of compensating for non-uniform line correlated noise generated in an image receptor associated with a medical diagnostic imaging device is disclosed. The medical diagnostic imaging device includes a source for generating x-rays, and the image receptor receives the x-rays and generates a raster line of image data. The method includes averaging the outputs of a first plurality of raster line pixels and a second plurality of raster line pixels; determining an interpolated offset value for a raster line pixel based on i) the average output values of the first plurality and second plurality of raster line pixels, and ii) the location of the pixel within the raster line; and modifying the output value of the pixel based on the interpolated offset value.

One advantage of the present invention is the provision of a method and apparatus which utilizes two reference zones, one at the start of a raster line and one at the end of the raster line, to perform blacklevel clamping.

Another advantage of the present invention is the provision of a method and apparatus which utilizes interpolation techniques to take a pixel's position in a raster line into account, when determining a line correlated noise-related error value.

Yet another advantage of the present invention is the use of a dual-reference blacklevel clamping technique in conjunction with amorphous Silicon flat panel imaging technology.

Still another advantage of the present invention is the use of dual reference blacklevel clamping in conjunction with medical fluoroscopic and radiographic imaging devices.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

DETAILED DESCRIPTION OF THE PREFERRED EMBODIMENT(S)

Figure 1:
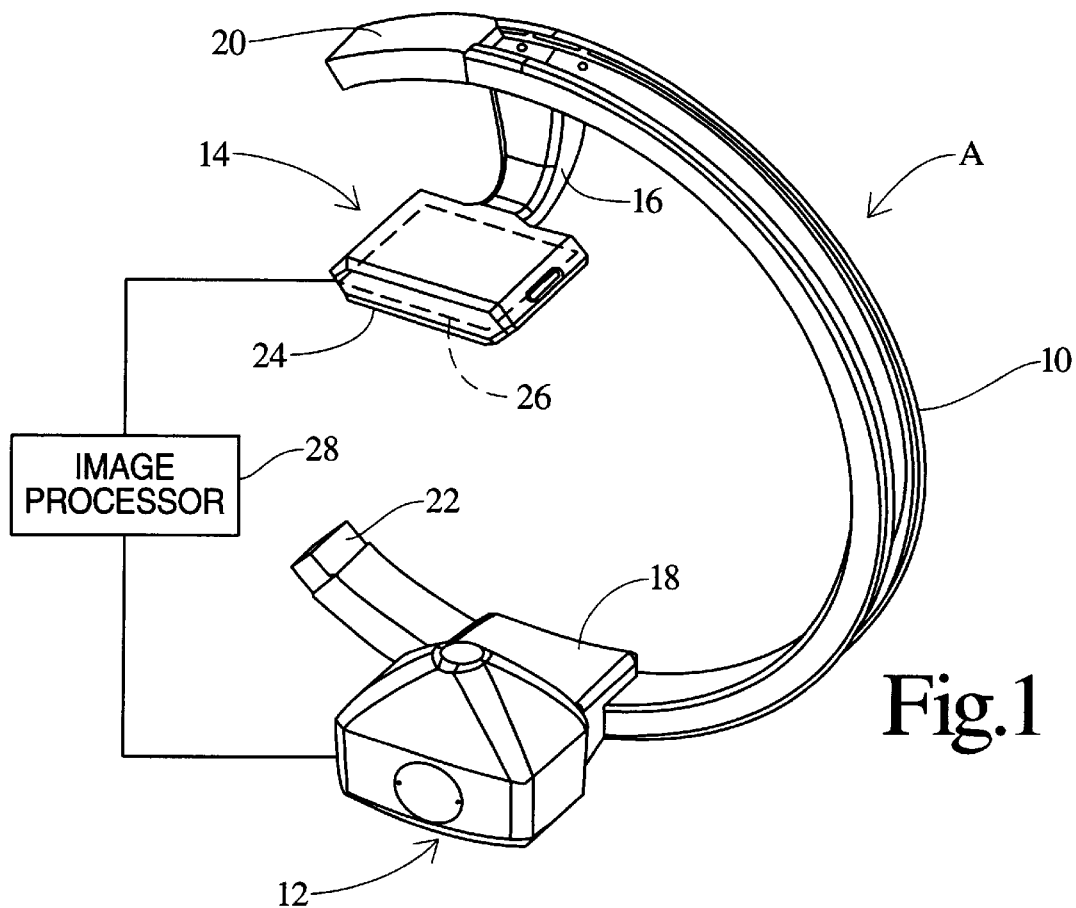
FIG. 1 is a perspective view of an exemplary diagnostic imaging system which incorporates the features of the present invention therein.

With reference to FIG. 1, an exemplary diagnostic imaging system A includes a support member 10 having an x-ray source 12 and an x-ray detector 14 secured thereto. The support member 10 can be a C-arm, and the x-ray source 12 and detector 14 can be secured proximate opposing ends of the C-arm via cantilevered support brackets 16, 18, respectively. The C-arm can be counterbalanced with upper and lower counterweights 20, 22 extending from the respective ends of the C-arm. It is also contemplated that the x-ray source 12 and detector 14 can be positioned within or proximate a bore of a diagnostic imaging device such as a CT scanner.

The detector 14 includes a housing 24 which supports a flat panel image receptor or array of image receptors 26. The flat panel image receptor 26 includes a planar substrate such as glass laminated with an array of sensors such as amorphous Silicon crystals. The flat panel image receptor 26 utilizes direct x-ray detection whereby x-rays are absorbed in a semi-conductor matrix, such as Selenium, Lead Sulfide, Cadmium Zinc Telluride, or Lead Iodide, and then converted directly to an electrical charge which is then accumulated by the amorphous Silicon matrix. The electrical charge can be read out from a row/column matrix and then converted to digital data.

Alternatively, the flat panel image receptor 26 can utilize indirect x-ray detection whereby x-rays are absorbed in a scintillating phosphor layer, such as Gadolinium Oxysulfide, Cesium Iodide, or Cadmium Tungstate, and then converted to light. An array of photodiodes on the glass substrate convert the light into electrical signals. The electrical signals are readout of a row/column matrix that is accessed using thin film transistor switches on the amorphous Silicon substrate. The analog data is then converted to a digital format. Suitable amorphous Silicon-based flat panel x-ray detectors are described, for example, in U.S. Pat. Nos. 5,079,426; 5,117,114; 5,164,809; and 5,262,649.

Figure 3:
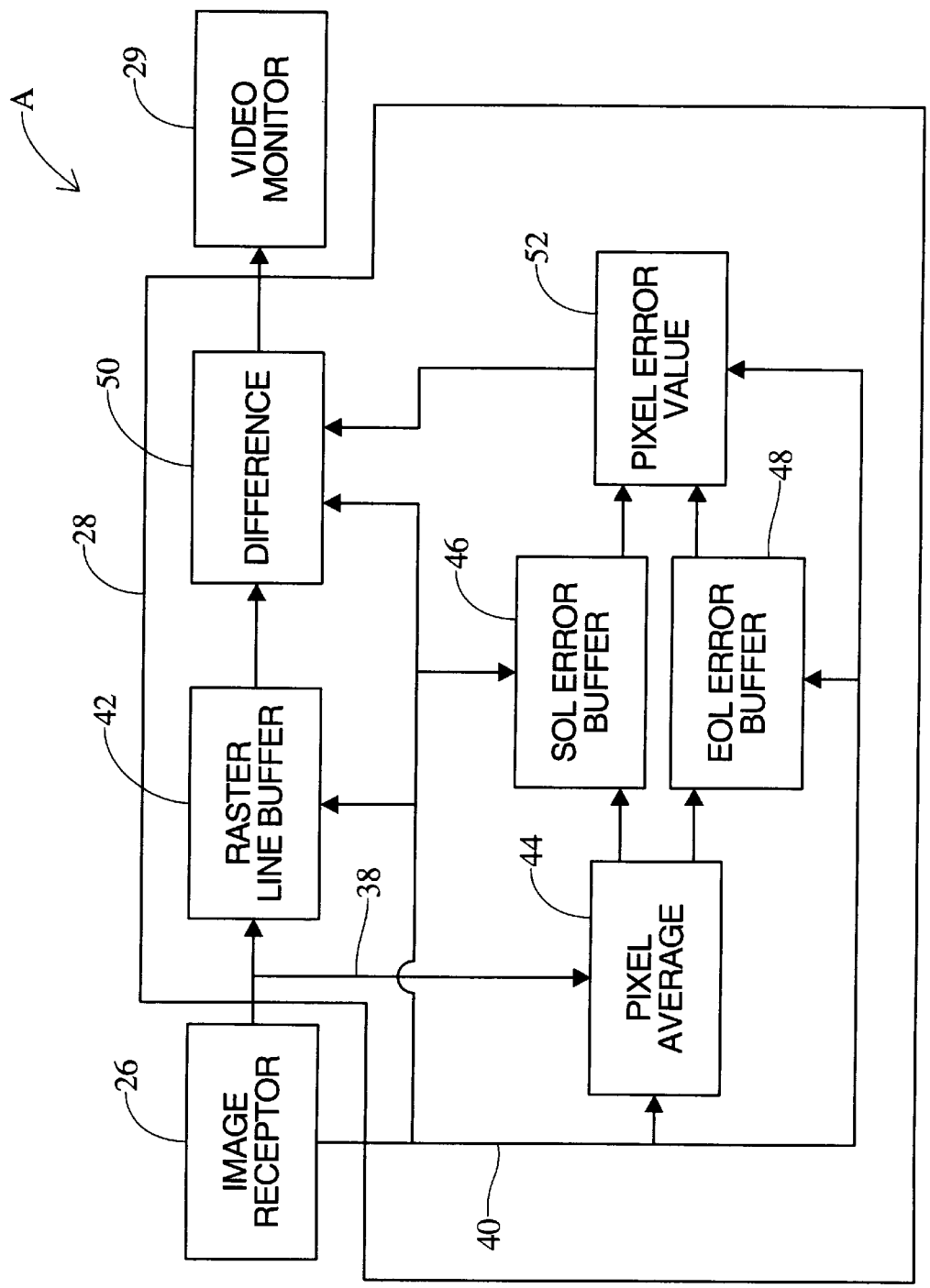
FIG. 3 is a simplified block diagram of the imaging system of FIG. 1.

The flat panel image receptor 26 constitutes an input component to an image processing subsystem 28. The image processing subsystem 28 generally assembles and transmits an acquired or captured image or a sequence of images (in the case of fluoroscopy imaging) to one or more video monitors 29 (FIG. 3). In addition, the subsystem 28 can employ scan converters for the image data so as to, for example, transmit assembled images to a laser transparency printer for radiographic recording, or to electronically store the media for archival purposes. The radiographic images that have been transferred to film can be displayed on a radiography viewing device such as a conventional light box (not shown).

Figure 2:
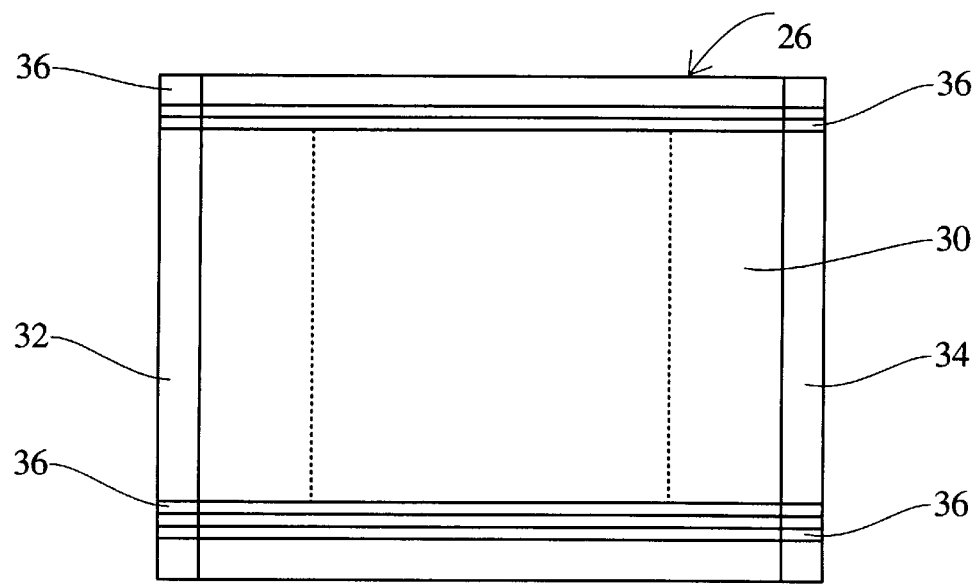
FIG. 2 is a diagrammatic bottom view of a flat panel image receptor associated with the diagnostic imaging system of FIG. 1.

Referring now to FIG. 2, the flat panel image receptor 26 as described above, is partitioned into an active region or area 30 bounded on either side by first and second reference zones 32, 34. A plurality of raster lines 36 extend across the receptor 26 such that the beginning of each raster line falls within the first reference zone 32, the central portion of each raster line falls within the active area 30, and the end of each raster line falls within the second reference zone 34.

The reference zones 32, 34 are positioned substantially normal to the raster lines 36 and serve to mask or otherwise mechanically block or prevent light or x-ray beams from impinging upon the underlying raster line elements. The width of each reference zone 32, 34 may vary to prevent image information from impinging upon any number of underlying raster line elements, typically up to about 256 elements. It should be appreciated that by "blacking-out" the first and second reference zones 32, 34, the only output signals or "information" received from the underlying raster line elements within the "blacked-out" reference zones is random noise and line correlated noise—the same line noise that affects the raster line elements in the exposed or active region 30 of the image receptor 26.

Referring now to FIG. 3, the image processing subsystem 28 receives analog or digital video data from the image receptor 26 or other upstream imaging process, in a standard raster pattern on one or more output lines 38. The video data from the image receptor 26 is accompanied by frame, line and/or pixel synchronization signals on one or more control lines 40. It should be appreciated that the dual reference blacklevel clamping device of the present invention can be implemented in hardware, software, firmware, or any combination thereof.

As a raster line of video data is piped into a temporary storage buffer or memory addresses 42 the outputs of the first N pixels in the raster line are sampled and averaged 44, with the resulting average value being stored in a start-of-line (SOL) error buffer or address location 46. Further, the outputs of the last N pixels in the raster line are sampled and averaged 42, and the resulting average value stored in an end-of-line (EOL) error buffer or address location 48 (where N is equal to the number of pixel elements within the reference zone(s)). It is contemplated that the width of one reference zone can vary from the width of the other reference zone.

Once the error values for the first and second reference zones are calculated and stored in the respective buffers/addresses 46, 48, the raster line stored in buffer/memory addresses 42 is sent to a downstream process such as the display monitor 29. As each pixel (P) of the stored raster line is clocked out of the buffer/memory addresses 42, a calculated error value ($P_{EV}$) is subtracted 50 from the pixel (P). The error value ($P_{EV}$) is determined 52 by linear interpolation between the start-of-line (SOL) and end-of-line (EOL) error values, taking the distance of the current pixel (P) from the start and end of the raster line into account.

In the preferred embodiment, the error value ($P_{EV}$) is calculated from:

$$P_{EV} = SOL_{ERROR} * ((p-P)/p) + EOL_{ERROR} * (P/p),$$

where P is the present pixel; p is the number of pixels forming the raster line; $SOL_{ERROR}$ is the start-of-line error value stored in buffer/memory address 46; and $EOL_{ERROR}$ is the end-of-line error value stored in buffer/memory address 48. It is contemplated that other formulas can be used to determine the error value $P_{EV}$.

Thus, rather than subtracting a constant error value from each active pixel in the raster line, sloped error values are subtracted from the pixels depending upon the pixel location within each raster line. Such a sloped error line better approximates line noise that is non-uniform across a video image than a single constant error value.

The invention has been described with reference to the preferred embodiment(s). Obviously, modifications and alterations will occur to others upon reading and understanding the preceding detailed description. It is intended that the invention be construed as including all such modifications and alterations insofar as they come within the scope of the appended claims or the equivalents thereof.

For instance, various techniques are contemplated for calculating the interpolated error values, delaying the image data flow by one or more lines, and calculating the start and end-of-line error values, etc. Further, it is contemplated that the invention can be implemented with digital, analog, or digital and analog hardware, as well as software, firmware, or any combination thereof.

In addition, specific reference is made to correcting for line correlated noise associated with an amorphous Silicon flat panel receptor. However, it is contemplated that the dual reference blacklevel clamping technique of the present invention is applicable with other image receptors in the medical and electronic imaging arts.

Having thus described the preferred embodiment(s), the invention is now claimed to be:

1. A medical diagnostic imaging device including a source for generating x-rays, an image receptor for receiving the x-rays, and an image processing subsystem for processing a raster line of image data received from the image receptor, the image processing subsystem including:
   means for determining an interpolated offset value for each pixel element of the raster line to compensate for non-uniform line correlated noise generated in the image receptor.

2. The device of claim 1, wherein the image receptor includes a plurality of reference zones which prevent image information from being received by corresponding pixel elements of the raster line.

3. The device of claim 1, wherein the determining means includes:
   means for storing the raster line;
   means for averaging the outputs of a first plurality of raster line pixels and a second plurality of raster line pixels;
   means for determining an interpolated offset value for each pixel element of the raster line based on the average output values of the first plurality and second plurality of raster line pixels, and based on the location of each pixel element within the raster line.

4. The device of claim 1, wherein the image receptor includes an active area, a first reference zone bounded on a first side of the active area, and a second reference zone bounded on a second side of the active area opposite to the first side, the reference zones preventing image information from being received by corresponding pixel elements of the raster line.

5. The device of claim 4, wherein the determining means includes:
   means for determining an interpolated offset value for a pixel element based on average output values of the pixels corresponding to the first and second reference zones, and based on the position of the pixel element within the raster line.

6. The device of claim 1, wherein the image receptor includes a flat panel image receptor.

7. The device of claim 6, wherein the flat panel image receptor includes an amorphous Silicon-based flat panel image receptor.

8. A medical diagnostic imaging device including a source for generating x-rays, an image receptor for receiving the x-rays, and an image processing subsystem for processing a raster line of image data received from the image receptor, the image receptor including:
   an active area, a first reference zone bounded on a first side of the active area, and a second reference zone bounded on a second side of the active area opposite to the first side, the reference zones preventing image information from being received by corresponding pixel elements of the raster line.

9. The device of claim 8, further including:
   an image processing subsystem for determining an interpolated offset value for each pixel element of the raster line to compensate for non-uniform line correlated noise generated in the image receptor.

10. The device of claim 9, wherein the image processing subsystem includes:
    means for storing the raster line;
    means for averaging the outputs of a first plurality of raster line pixels and a second plurality of raster line pixels; and
    means for determining an interpolated offset value for each pixel element of the raster line based on the average output values of the first plurality and second plurality of raster line pixels, and based on the location of each pixel element within the raster line.

11. The device of claim 8, wherein the image receptor includes a flat panel image receptor.

12. The device of claim 11, wherein the flat panel image receptor includes an amorphous Silicon-based flat panel image receptor.

13. A method of compensating for non-uniform line correlated noise generated in an image receptor associated with a medical diagnostic imaging device including a source for generating x-rays, the image receptor receiving the x-rays and generating a raster line of image data, the method including:
    averaging the outputs of a first plurality of raster line pixels and a second plurality of raster line pixels;
    determining an interpolated offset value for a raster line pixel based on i) the average output values of the first plurality and second plurality of raster line pixels, and ii) the location of the pixel within the raster line; and
    modifying the output value of the pixel based on the interpolated offset value.

14. The method of claim 13, wherein the image receptor includes an active area, a first reference zone bounded on a first side of the active area, and a second reference zone bounded on a second side of the active area opposite to the first side, the reference zones preventing image information from being received by corresponding pixels of the raster line.

15. The method of claim 14, wherein the averaging step includes averaging the outputs of the raster line pixels corresponding to the first reference zone, and averaging the outputs of the raster line pixels corresponding to the second reference zone.

16. The method of claim 13, wherein the image receptor includes a flat panel image receptor.

17. The method of claim 16, wherein the flat panel image receptor includes an amorphous Silicon-based flat panel image receptor.

18. The method of claim 13, wherein interpolated offset value is determined from the equation:

$$P_{EV}=\text{SOL}_{ERROR}*((p-P)/p)+\text{EOL}_{ERROR}*(P/p),$$

where P is the present pixel; p is the number of pixels forming the raster line; $\text{SOL}_{ERROR}$ is the average output value of the first plurality raster line pixels; and $\text{EOL}_{ERROR}$ is the average output value of the second plurality raster line pixels.

* * * * *